(12) United States Patent
Calman

(10) Patent No.: US 9,043,609 B2
(45) Date of Patent: May 26, 2015

(54) IMPLEMENTING SECURITY MEASURES FOR AUTHORIZED TOKENS USED IN MOBILE TRANSACTIONS

(75) Inventor: Matthew A. Calman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/553,463

(22) Filed: Jul. 19, 2012

(65) Prior Publication Data

US 2014/0025958 A1 Jan. 23, 2014

(51) Int. Cl.
*G06Q 20/32* (2012.01)
*G06Q 20/36* (2012.01)
*G06F 21/00* (2013.01)

(52) U.S. Cl.
CPC .......... *G06Q 20/367* (2013.01); *G06Q 20/3224* (2013.01); *G06F 21/00* (2013.01)

(58) Field of Classification Search
None
See application file for complete search history.

(56) References Cited

U.S. PATENT DOCUMENTS

| 5,513,250 | A | 4/1996 | McAllister |
| 6,327,578 | B1 | 12/2001 | Linehan |
| 7,908,645 | B2 | 3/2011 | Varghese et al. |
| 8,001,080 | B2 | 8/2011 | Gupta et al. |
| 2002/0103934 | A1 | 8/2002 | Fishman et al. |
| 2003/0163427 | A1 | 8/2003 | Fung et al. |
| 2006/0235796 | A1 | 10/2006 | Johnson et al. |
| 2007/0266130 | A1 | 11/2007 | Mazur et al. |
| 2008/0294563 | A1 | 11/2008 | Boutahar et al. |
| 2009/0023474 | A1 | 1/2009 | Luo et al. |
| 2010/0085947 | A1 | 4/2010 | Ringland et al. |
| 2010/0280927 | A1 | 11/2010 | Faith et al. |
| 2010/0312657 | A1 | 12/2010 | Coulter et al. |
| 2010/0329462 | A1 | 12/2010 | Adachi et al. |
| 2011/0030039 | A1 | 2/2011 | Bilange |
| 2011/0246316 | A1 | 10/2011 | Cincera |
| 2011/0251892 | A1 | 10/2011 | Laracey |
| 2012/0022980 | A1 | 1/2012 | Angelone |
| 2012/0030047 | A1 | 2/2012 | Fuentes et al. |
| 2012/0316992 | A1* | 12/2012 | Oborne ...................... 705/26.41 |
| 2014/0213305 | A1 | 7/2014 | Kannan |
| 2014/0229304 | A1 | 8/2014 | White |

FOREIGN PATENT DOCUMENTS

WO WO 2009/112793 9/2009 ............. G06Q 20/00

OTHER PUBLICATIONS

U.S. Appl. No. 13/553,423, filed Jul. 19, 2012 entitled, "Distributing Authorized Tokens to Conduct Mobile Transactions," inventor: Matthew A. Calman, 37 pages.

(Continued)

*Primary Examiner* — Gilberto Barron, Jr.
*Assistant Examiner* — Simon Kanaan
(74) *Attorney, Agent, or Firm* — Michael A. Springs

(57) ABSTRACT

Security measures for tokens comprise storing security rules associated with a generated token in a memory. A processor, communicatively coupled to the memory, accesses the security rules associated with the generated token and determines whether to encrypt the generated token by applying at least a portion of the security rules to the generated token. The processor encrypts the generated token. An interface, communicatively coupled to the processor, communicates the encrypted token to a mobile device associated with a user.

18 Claims, 5 Drawing Sheets

(56) References Cited

OTHER PUBLICATIONS

U.S. Appl. No. 13/553,511, filed Jul. 19, 2012 entitled, "Mobile Transactions Using Authorized Tokens," inventor: Matthew A. Calman, 32 pages.
PCT Notification of Transmittal of the International Search Report and the Written Opinion of the International Searching Authority, or the Declaration with attached International Search Report and the Written Opinion of the International Searching Authority in International Application No. PCT/US2013/034962, dated Jun. 27, 2013, 10 pages.
U.S. Patent and Trademark Office Official Action in U.S. Appl. No. 13/553,423 dated Jun. 27, 2013, 10 pages.
U.S. Patent and Trademark Office Official Action in U.S. Appl. No. 13/553,511 dated Jul. 11, 2013, 15 pages.
PCT Notification of Transmittal of the International Search Report and the Written Opinion of the International Searching Authority, or the Declaration with attached International Search Report and Written Opinion of the International Searching Authority in International Application No. PCT/US2013/034963, dated Jul. 25, 2013, 10 pages.
PCT Notification of Transmittal of the International Search Report and the Written Opinion of the International Searching Authority, or the Declaration with attached International Search Report and the Written Opinion of the International Searching Authority in International Application No. PCT/US2013/034957 dated Jul. 25, 2013, 10 pages.
U.S. Patent and Trademark Office Official Action in U.S. Appl. No. 13/553,511 dated Dec. 10, 2013, 22 pages.
U.S. Patent and Trademark Office Official Action in U.S. Appl. No. 13/553,423, dated Nov. 6, 2013, 20 pages.
U.S. Patent and Trademark Office Official Action in U.S. Appl. No. 13/553,423, dated May 1, 2014, 23 pages.
U.S. Patent and Trademark Office Official Action in U.S. Appl. No. 13/553,511 dated Oct. 31, 2014, 22 pages.
U.S. Patent and Trademark Office Official Action in U.S. Appl. No. 13/553,423, dated Oct. 29, 2014, 26 pages.

\* cited by examiner

IMPLEMENTING SECURITY MEASURES FOR AUTHORIZED TOKENS USED IN MOBILE TRANSACTIONS

TECHNICAL FIELD OF THE INVENTION

This invention relates generally to mobile transactions and, more specifically, to implementing security measures for authorized tokens used in mobile transactions.

BACKGROUND OF THE INVENTION

Customers desire to use their mobile devices to conduct mobile transactions. However, mobile devices may not consistently have reliable network connections to complete the transaction.

SUMMARY OF THE INVENTION

In accordance with the teachings of the present disclosure, disadvantages and problems associated with implementing security measures for authorized tokens used in mobile transactions may be reduced or eliminated.

According to an exemplary embodiment, security measures for tokens comprise storing security rules associated with a generated token in a memory. A processor, communicatively coupled to the memory, accesses the security rules associated with the generated token and determines whether to encrypt the generated token by applying at least a portion of the security rules to the generated token. The processor encrypts the generated token. An interface, communicatively coupled to the processor, communicates the encrypted token to a mobile device associated with a user.

Certain embodiments of the invention may provide one or more technical advantages. A technical advantage of one embodiment includes completing a mobile payment transaction using a mobile device without using a network and/or a mobile gateway. Therefore, a user is able to complete mobile transactions even though the network and/or mobile gateway are unavailable. Another technical advantage includes providing an authorized token to a mobile device for the mobile device to store and use to complete a mobile transaction at a future time. Therefore, the mobile device is able to complete mobile transactions using the stored, authorized token without having to communicate with an issuer to receive an authorized token or other real-time authorization at the time of the mobile transaction. Another technical advantage includes providing an authorized token to a mobile device for a mobile device to have access control. Yet another technical advantage includes providing security measures to the authorized token to minimize possible fraudulent use of the authorized token by someone other than the authorized user.

Certain embodiments of the present disclosure may include none, some, or all of the above technical advantages. One or more other technical advantages may be readily apparent to one skilled in the art in view of the figures, descriptions, and claims of the present disclosure.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE INVENTION

Embodiments of the present invention and its advantages are best understood by referring to FIGS. 1 through 7, like numerals being used for like and corresponding parts of the various drawings.

Figure 1:
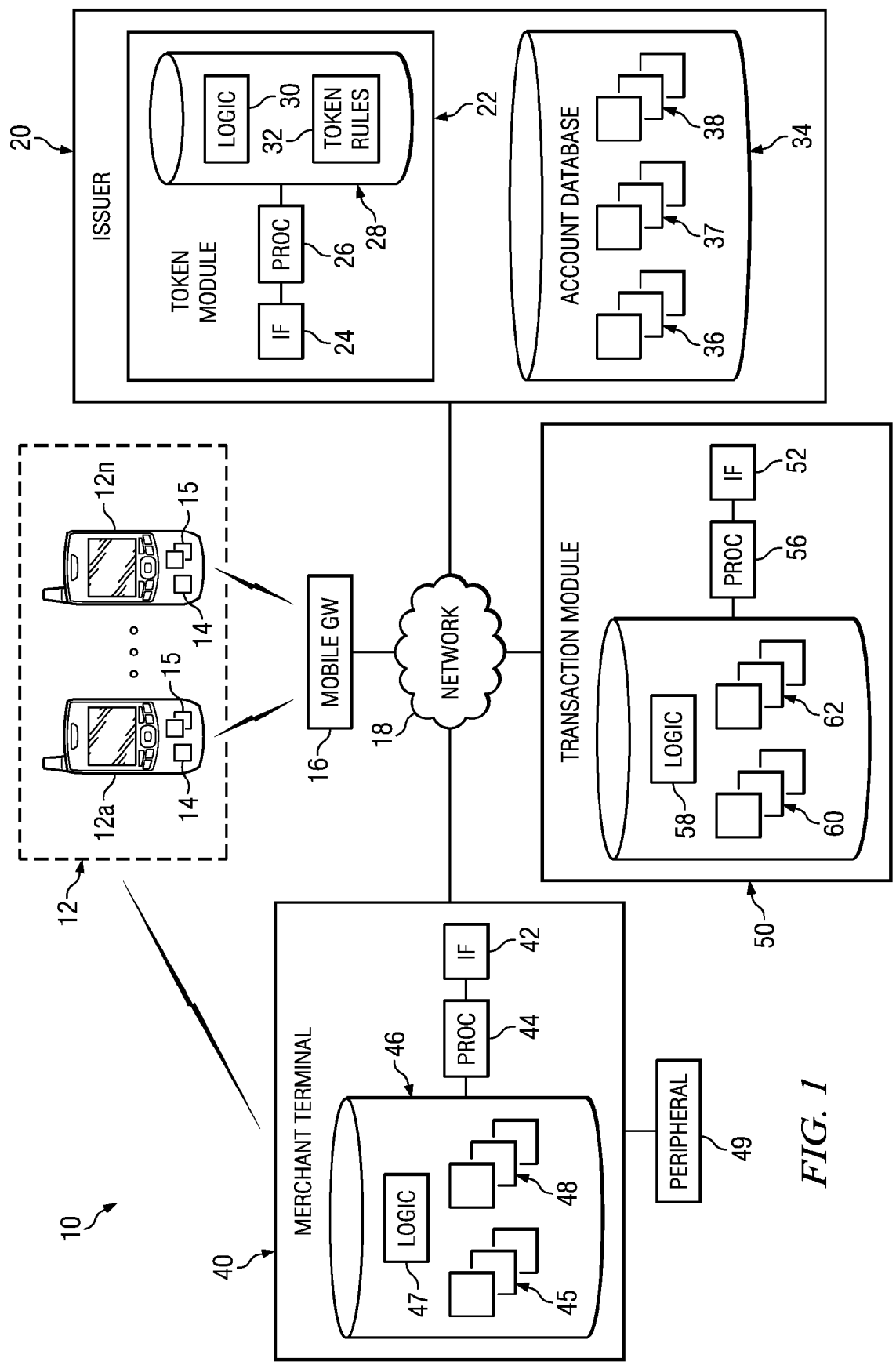
FIG. 1 illustrates an example system that facilitates using authorized tokens to conduct mobile transactions.

FIG. 1 illustrates an example system 10 that facilitates using authorized tokens to conduct mobile transactions. System 10 includes mobile devices 12 and issuer 20 that communicate authorized tokens over network 18. When mobile device 12 stores the authorized token, mobile device 12 communicates with merchant terminal 40 to conduct a mobile transaction using the authorized token received from issuer 20. After receiving the authorized token, merchant terminal 40 may communicate with transaction module 50 to reconcile the mobile transaction.

System 10 includes mobile devices 12a-12n, where n represents any suitable number, that communicate with issuer 20 and merchant terminal 40. Mobile device 12 may include a wireless or cellular telephone, an electronic notebook, a personal digital assistant, a smartphone, a netbook, a tablet, a slate personal computer, or any other device capable of receiving, processing, storing, and/or communicating information with other components of system 10. Mobile device 12 may also comprise a user interface, such as a display, keyboard, mouse, or other appropriate terminal equipment. In certain embodiments, mobile device 12 may include components that facilitate communication with merchant terminal 40 without using mobile gateway 16 and/or network 18. For example, mobile device 12 may use Short Message Service ("SMS"), the Near Field Communications ("NFC") protocol, the Bluetooth® protocol, Wireless Fidelity ("Wi-Fi"), infrared techniques, a Quick Response ("QR") code, a bar code, or any other suitable communication technique to communicate with merchant terminal 40.

In the illustrated embodiment, mobile device 12 includes token application 14. Token application 14 represents software operable to facilitate the receipt and communication of authorized tokens to complete mobile transactions. Token application 14 may also facilitate the determination of when to request a token. Token application 14 also communicates with merchant terminal 40 to complete a mobile payment transaction using the authorized token. Token application 14 may execute on mobile device 12 from local memory or from a remote memory location (e.g., a cloud environment). In certain embodiments, a user accesses token application 14 and communicates with issuer 20 to receive an authorized token. In another embodiment, token application 14 determines when to communicate with issuer 20 to request an authorized token. In certain embodiments, token application 14 may request a token from issuer 20 on a periodic basis. For example, token application 14 may facilitate a token request every fifteen minutes.

In other embodiments, token application 14 may determine when to request a token based any one or more of the following factors (i.e., token criteria): when a user is moving, when mobile device 12 is moving, when a user uses mobile device 12 to complete payment transactions, when mobile device 12 is connected to mobile gateway 16, when mobile device 12 is communicating with network 18, when a previously received authorized token has expired, or any other suitable factor. For example, when token application 14 determines that a user is in a particular location associated with shopping, token application 14 may initiate a request for a token. As another example, token application 14 may determine that mobile gateway 16 is available and may initiate a token request based on the availability of mobile gateway 16. With respect to connectivity with mobile gateway 16, token application 14 may facilitate caching data associated with the performance of mobile gateway 16. By caching the performance data, token application 14 may predict the performance of mobile gateway 16 and request a token based on when token application 14 predicts that mobile gateway 16 may be available. Additionally, token application 14 may determine to use a stored token based on a prediction that mobile gateway 16 may be unavailable. Token application 14 may measure the performance of mobile gateway 16 while the user of mobile device 12 is moving or according to regular mobility patterns of a user or a group of users.

In the illustrated embodiment, mobile device 12 also includes tokens 15. Tokens 15 represent a pre-authorization to complete a mobile payment transaction. The pre-authorization may be for a particular amount, for use in a particular geographic region, for use during a particular time period, or for any other factor. For example, token 15 may represent a pre-authorization to spend $25.00 within a one-mile radius of the user's current location. Token 15 may also include security mechanisms to deter fraudulent or unauthorized use. For example, token 15 may be encrypted using a digital certificate. As another example, token 15 may be associated with a user identifier, a personal account number, an identifier of mobile device 12 (such as an International Mobile Equipment Identifier ("IMEI") or serial number), a biometric identifier, or any other suitable identifier.

In an embodiment, mobile device 12 receives token 15 from issuer 20 and may use token 15 to complete a mobile transaction with merchant terminal 40 if mobile gateway 16 and/or network 18 are unavailable. By storing token 15 on mobile device 12, a user may continue to conduct transactions using mobile device 12 without mobile or network connectivity.

Mobile device 12 communicates with mobile gateway 16 to receive the authorized tokens from issuer 20. Mobile gateway 16 represents a telecommunications component that facilitates communications between mobile device 12 and other components in system 10. Mobile gateway 16 may include a plurality of components to facilitate the communication, such as a base transceiving station, a base station controller, a mobile switching center, a gateway switching center, or other suitable mobile network component.

Network 18 represents any suitable network operable to facilitate communication between the components of system 10, such as mobile devices 12, issuer 20, merchant terminal 40, and transaction module 50. Network 18 may include any interconnecting system capable of transmitting audio, video, signals, data, messages, or any combination of the preceding. Network 18 may include all or a portion of a public switched telephone network (PSTN), a public or private data network, a LAN, a metropolitan area network (MAN), WAN, a local, regional, or global communication or computer network, such as the Internet, a wireline or wireless network, an enterprise intranet, or any other suitable communication link, including combinations thereof, operable to facilitate communication between the components.

Issuer 20 represents any suitable components that generate and communicate authorized tokens to mobile device 12 for use in a mobile transaction. In certain embodiments, issuer 20 provides approval, using the tokens, for a user of mobile device 12 to conduct mobile transactions up to a pre-determined value. The token having the pre-determined value can be stored on mobile device 12. Issuer 20 may include a network server, any suitable remote server, a mainframe, a host computer, a workstation, a web server, a personal computer, a file server, or any other suitable device operable to communicate with mobile devices 12, merchant terminal 40, and/or transaction module 50. In some embodiments, issuer 20 may execute any suitable operating system such as IBM's zSeries/Operating System (z/OS), MS-DOS, PC-DOS, MAC-OS, WINDOWS, UNIX, OpenVMS, or any other appropriate operating system, including future operating systems. The functions of issuer 20 may be performed by any suitable combination of one or more servers or other components at one or more locations. In the embodiment where issuer 20 is a server, the server may be a private server, and the server may be a virtual or physical server. The server may include one or more servers at the same or remote locations. Also, issuer 20 may include any suitable component that functions as a server.

In some embodiments, issuer 20 receives a request from mobile device 12 for an authorized token to use for mobile transactions. In other embodiments, issuer 20 monitors factors associated with mobile device 12 and/or factors associated with a user of mobile device 12 and generates authorized tokens for mobile device 12 to use for mobile transactions based on the monitoring. The factors (i.e., token criteria) to monitor that may impact whether a token is generated may include the following: a user's mobility, a user's spending patterns, a user's current location, expiration of a previously issued token, real-time data regarding network performance of the mobile network, and/or past data regarding network performance of the mobile network. Token module 22 and account database 34 facilitate the generation of authorized tokens by issuer 20.

In the illustrated embodiment, token module 22 includes network interface 24, processor 26, and memory 28. Network interface 24 represents any suitable device operable to receive information from network 18, transmit information through network 18, perform processing of information, communicate with other devices, or any combination of the preceding. For example, network interface 24 receives requests from mobile device 12a to generate an authorized token. As another example, network interface 24 may communicate (i.e., "push") a generated authorized token to mobile device 12a. As another example, network interface 24 may communicate decryption information associated with the authorized token to merchant terminal 40. Network interface 24 represents any port or connection, real or virtual, including any suitable hardware and/or software, including protocol conversion and data processing capabilities, to communicate through a LAN, WAN, or other communication system that allows token module 22 to exchange information with network 18, mobile devices 12, merchant terminal 40, or other components of system 10.

Processor 26 communicatively couples to network interface 24 and memory 28, and controls the operation and administration of token module 22 by processing information received from network interface 24 and memory 28. Processor 26 includes any hardware and/or software that operates to control and process information. For example, processor 26 executes logic 30 to control the operation of token module 22. Processor 26 may be a programmable logic device, a microcontroller, a microprocessor, any suitable processing device, or any suitable combination of the preceding.

Memory 28 stores, either permanently or temporarily, data, operational software, or other information for processor 26. Memory 28 includes any one or a combination of volatile or non-volatile local or remote devices suitable for storing information. For example, memory 28 may include RAM, ROM, magnetic storage devices, optical storage devices, or any other suitable information storage device or a combination of these devices. While illustrated as including particular modules, memory 28 may include any suitable information for use in the operation of token module 22.

In the illustrated embodiment, memory 28 includes logic 30 and token rules 32. Logic 30 generally refers to logic, rules, algorithms, code, tables, and/or other suitable instructions embodied in a computer-readable storage medium for performing the described functions and operations of token module 22. Token rules 32 generally refer to the rules that token module 22 implements to determine whether to generate an authorized token and to determine the factors associated with the authorized token (e.g., amount, time restrictions, and/or geographic restrictions). Additionally, token rules 32 may facilitate the determination of which security measures to apply to an authorized token. For example, token rules 32 may be implemented to determine whether to encrypt the token, whether to require a personal identification to use the token, whether to require a biometric identification to use the token, whether to link the token to an identifier of mobile device 12, or any other security measures.

Account database 34 stores, either permanently or temporarily, information associated with users and information associated with the authorized tokens. In the illustrated embodiment, account database 34 stores encryption certificates 36, decryption certificates 37, and user account information 38. Encryption certificates 36 represent files that encrypt authorized tokens for use in mobile transactions. In an embodiment, token module 22 encrypts a generated authorized token with encryption certificate 36 before communicating the authorized token to mobile device 12. Decryption certificates 37 represent files that allow for decryption of the encrypted authorized token that is used during a mobile transaction. In an embodiment, issuer 20 communicates decryption certificates 37 to merchant terminal 40 to decrypt tokens received from mobile device 12 when conducting a mobile payment transaction. Account information 38 represents account data associated with users of mobile devices 12. Account information 38 may include transaction history, account balances, user identification information, user preferences, or any other suitable information that provides information regarding a user's account. Additionally, account information 38 may refer to token criteria, which informs token module 22 regarding token generation. For example, token criteria may include the current location of the user, spending patterns of the user, mobility patterns of the user, mobile network connectivity data, and/or previously expired token information.

Merchant terminal 40 represents any suitable component that facilitates a mobile transaction with mobile device 12. Merchant terminal 40 may be associated with a retailer, a wholesaler, a service company, or any other suitable entity that has customers and conducts transactions with the customers. In an embodiment, these transactions may include mobile payment transactions that include receiving payment for goods or services from a user using mobile device 12. Merchant terminal 40 may include a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 10.

In the illustrated embodiment, merchant terminal 40 includes interface 42, processor 44, and memory 46. Interface 42 represents any suitable device operable to receive information from network 18, transmit information through network 18, perform processing of information, communicate with other devices, or any combination of the preceding. For example, interface 42 receives an authorized token for payment from mobile device 12. As another example, interface 42 may receive decryption information from issuer 20 that allows merchant terminal 40 to decrypt the received authorized token. As yet another example, interface 42 may communicate one or more authorized tokens to transaction module 50 to reconcile the transaction and have the appropriate funds transferred into the merchant's account. Interface 42 represents any port or connection, real or virtual, including any suitable hardware and/or software, including protocol conversion and data processing capabilities, to communicate through a LAN, WAN, or other communication system that allows merchant terminal 40 to exchange information with network 18, mobile devices 12, transaction module 50, or other components of system 10.

Processor 44 communicatively couples to interface 42 and memory 46, and controls the operation and administration of merchant terminal 40 by processing information received from interface 42 and memory 46. Processor 44 includes any hardware and/or software that operates to control and process information. For example, processor 44 executes logic 47 to control the operation of merchant terminal 40. Processor 44 may be a programmable logic device, a microcontroller, a microprocessor, any suitable processing device, or any suitable combination of the preceding.

Memory 46 stores, either permanently or temporarily, data, operational software, or other information for processor 44. Memory 46 includes any one or a combination of volatile or non-volatile local or remote devices suitable for storing information. For example, memory 46 may include RAM, ROM, magnetic storage devices, optical storage devices, or any other suitable information storage device or a combination of these devices. While illustrated as including particular modules, memory 46 may include any suitable information for use in the operation of merchant terminal 40.

In the illustrated embodiment, memory 46 includes logic 47, tokens 45, and decryption information 48. Logic 47 generally refers to logic, rules, algorithms, code, tables, merchant preferences, and/or other suitable instructions embodied in a computer-readable storage medium for performing the described functions and operations of merchant terminal 40. Tokens 45 refer to the tokens that merchant terminal 40 receives for mobile payment. In an embodiment, merchant terminal 40 stores tokens 45 and transmits the stored tokens 45 to transaction module 50 for processing and reconciliation. Decryption information 48 refers to information that is used to decrypt a received token from mobile 12. Decryption information 48 may include decryption certificates and/or data used to authenticate the user, such as biometric data, identifiers associated with the user, and/or identifiers associated with mobile device 12.

Peripheral 49 is communicatively coupled to merchant terminal 40 and facilitates the transaction between mobile device 12 and merchant terminal 40. For example, peripheral 49 may include a screen, a keyboard, a stylus, a camera, a bar code reader, or any other suitable device that allows for mobile device 12 to conduct the transaction with merchant terminal 40.

Transaction module 50 represents any suitable components that authorize and reconcile transactions using authorized tokens for merchant terminal 40. Transaction module 50 may include a network server, any suitable remote server, a mainframe, a host computer, a workstation, a web server, a personal computer, a file server, or any other suitable device operable to communicate with issuer 20 and/or merchant terminal 40. In some embodiments, transaction module 50 may execute any suitable operating system such as IBM's zSeries/Operating System (z/OS), MS-DOS, PC-DOS, MAC-OS, WINDOWS, UNIX, OpenVMS, or any other appropriate operating system, including future operating systems. The functions of transaction module 50 may be performed by any suitable combination of one or more servers or other components at one or more locations. In the embodiment where transaction module 50 is a server, the server may be a private server, and the server may be a virtual or physical server. The server may include one or more servers at the same or remote locations. Also, transaction module 50 may include any suitable component that functions as a server.

In some embodiments, transaction module 50 receives a request from merchant terminal 40 to authorize a token to complete a mobile payment transaction. In this embodiment, transaction module 50 may communicate an authorization to merchant terminal 40 to complete the transaction. In other embodiments, transaction module 50 receives an authorized token from merchant terminal 40 for a particular amount and transaction module 50 reconciles the amount to an account associated with merchant terminal 40.

In the illustrated embodiment, transaction module 50 includes network interface 52, processor 54, and memory 56. Network interface 52 represents any suitable device operable to receive information from network 18, transmit information through network 18, perform processing of information, communicate with other devices, or any combination of the preceding. For example, network interface 52 receives requests from merchant terminal 40 to authorize a token to complete a mobile payment transaction. As another example, network interface 52 may communicate an authorization to merchant terminal 40 upon authenticating the token. As another example, network interface 52 may receive decryption certificates from issuer 20 to use to authenticate a token. Network interface 52 represents any port or connection, real or virtual, including any suitable hardware and/or software, including protocol conversion and data processing capabilities, to communicate through a LAN, WAN, or other communication system that allows transaction module 50 to exchange information with network 18, issuer 20, merchant terminal 40, or other components of system 10.

Processor 54 communicatively couples to network interface 52 and memory 56, and controls the operation and administration of transaction module 50 by processing information received from network interface 52 and memory 56. Processor 54 includes any hardware and/or software that operates to control and process information. For example, processor 54 executes logic 58 to control the operation of transaction module 50. Processor 54 may be a programmable logic device, a microcontroller, a microprocessor, any suitable processing device, or any suitable combination of the preceding.

Memory 56 stores, either permanently or temporarily, data, operational software, or other information for processor 54. Memory 56 includes any one or a combination of volatile or non-volatile local or remote devices suitable for storing information. For example, memory 56 may include RAM, ROM, magnetic storage devices, optical storage devices, or any other suitable information storage device or a combination of these devices. While illustrated as including particular modules, memory 56 may include any suitable information for use in the operation of transaction module 50.

In the illustrated embodiment, memory 56 includes logic 58, decryption certificates 60, and authorized tokens 62. Logic 58 generally refers to logic, rules, algorithms, code, tables, and/or other suitable instructions embodied in a computer-readable storage medium for performing the described functions and operations of transaction module 50. Decryption certificates 60 represent files that allow for decryption of the encrypted authorized token that is used during a mobile transaction. In an embodiment, issuer 20 communicates decryption certificates 60 to transaction module 50 to decrypt tokens received from merchant terminal 40. Authorized tokens 62 refer to the tokens that transaction module 50 receives for reconciliation to an account associated with merchant terminal 40.

In an exemplary embodiment of operation, issuer 20 generates a token for mobile device 12 that allows a user of mobile device 12 to conduct mobile payment transactions without mobile and/or network connectivity. In determining whether to generate the token, issuer 20 considers various token criteria associated with the user. The token criteria may include the current location of the user, spending patterns of the user, mobility patterns of the user, mobile network connectivity data, and/or previously expired token information. Once issuer 20 determines to generate the token, issuer 20 encrypts the token and may associate additional security measures with the token to prevent unauthorized use of the token. The additional security measures may include requiring a personal identification to use the token, requiring biometric identification to use the token, linking the token to an identifier of mobile device 12, or any other security measures. Issuer 20 communicates the token to mobile device 12, and mobile device 12 stores the token for future use.

In an embodiment, a user attempts to complete a mobile payment transaction when mobile gateway 16 and/or network 18 are unavailable. To complete the mobile payment transaction, a user may use the stored token on mobile device 12. Using mobile device 12, a user communicates the token to merchant terminal 40 to complete the mobile payment transaction. Mobile device 12 communicates the token using SMS, NFC, Bluetooth®, Wi-Fi, infrared techniques, a QR code, and/or a bar code. Because the token is encrypted, the received token is decrypted for authentication. In an embodiment, merchant terminal 40 uses decryption information 48 to decrypt the received token. In another embodiment, merchant terminal 40 communicates the received token to transaction module 50, and transaction module 50 decrypts the received token using decryption certificates 60. In addition to decrypting the token, additional security measures may need to be satisfied to authorize the transaction. For example, a user may need to provide biometric data or other personal identification information to merchant terminal 40, either directly or using mobile device 12. As another example, merchant terminal 40 may confirm the identification associated with mobile device 12. If the security measures are not satisfied, merchant terminal 40 communicates a transaction denial to mobile device 12. In another embodiment, merchant terminal 40 may directly display a transaction denial to the user. If the security measures are satisfied, the token may be authenticated and processing continues.

When the token is authenticated, an amount associated with the transaction is debited from the token amount. In addition to decrementing the token on mobile device 12 by the transaction amount, the number of uses may be decremented from the token. Upon completion of the transaction, the token may be deleted or retired or the token may immediately expire. That received amount from the token can then be reconciled to an account associated with merchant terminal 40. Merchant terminal 40 may communicate the token amount information to transaction module 50 immediately upon approval of the transaction, or merchant terminal 40 may hold the token amount information for later processing and reconciliation by transaction module 50.

A component of system 10 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory, tangible media, such as a computer-readable medium or any other suitable non-transitory, tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 10 without departing from the scope of the invention. For example, issuer 20 may include transaction module 50. Additionally, system 10 may include any number of mobile devices 12, mobile gateways 16, networks 18, issuers 20, merchant terminals 40, and/or transaction modules 50. As another example, system 10 may be used for various cases in addition to conducting mobile transactions. For example, a user may use mobile device 12 for access control. In this example, a company may issue a key, using a token, to a user's mobile device 12, and the user may use mobile device 12 for access. As described above with respect to mobile transactions, the token for access control may be limited to specific restrictions, such as time and geography. As yet another example, issuer 20 may be associated with the network operator of network 18. Any suitable logic may perform the functions of system 10 and the components within system 10.

Figure 2:
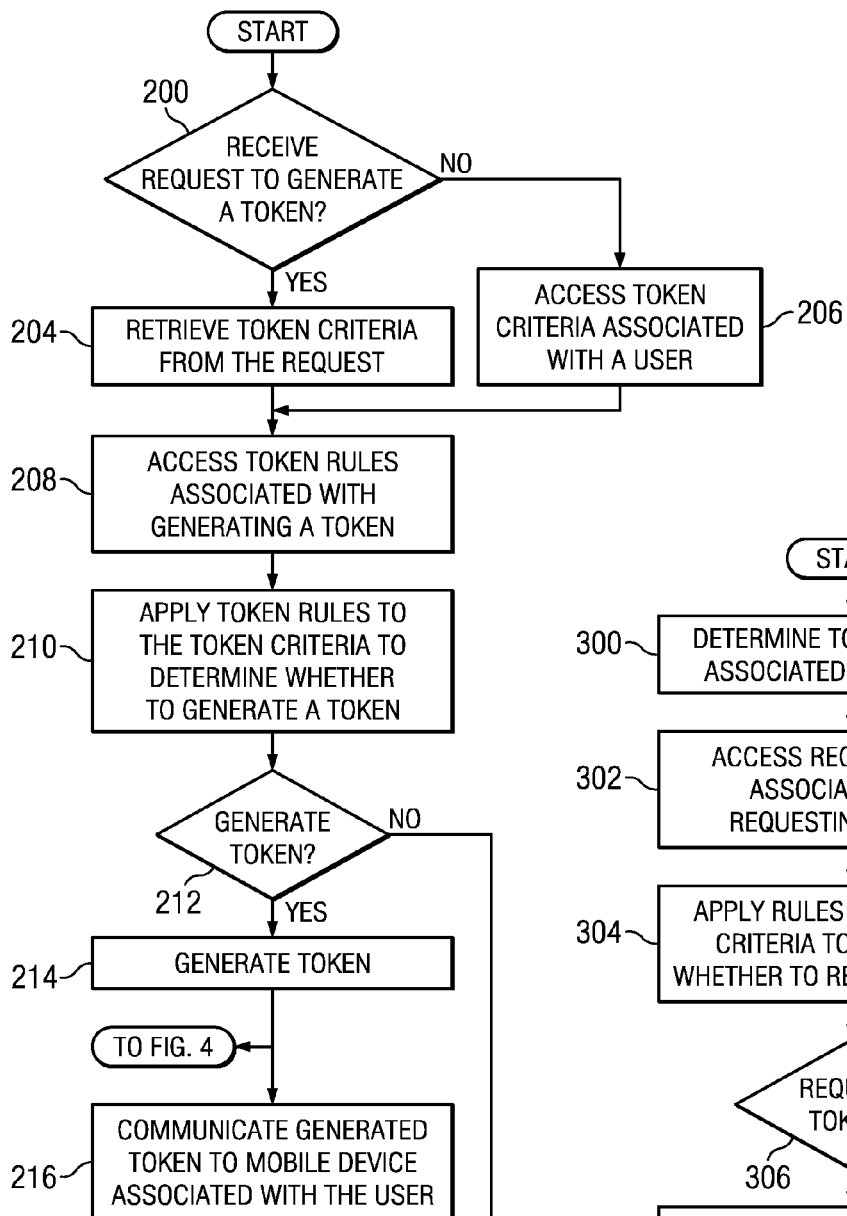
FIG. 2 illustrates an example method for distributing the authorized tokens from an issuer to conduct mobile transactions.

FIG. 2 illustrates an example method for distributing the authorized tokens from issuer 20 to conduct mobile transactions. At step 200, issuer 20 determines whether it has received a request to generate a token. If issuer 20 receives a request from mobile device 12, issuer 20 retrieves token criteria from the request at step 204. If issuer 20 does not receive a request, issuer 20 accesses token criteria associated with a user from account database 34 at step 206. Examples of the token criteria that issuer 20 may access include: a user's mobility, a user's bearing, a user's speed, a user's spending patterns, a user's current location, expiration of a previously issued token, and/or data regarding network performance of the mobile network. After retrieving the token criteria from the request or accessing the token criteria from account database 34, issuer 20 accesses tokens rules associated with generating a token at step 208. At step 210, issuer 20 applies the token rules to the token criteria to determine whether to generate a token. At step 212, issuer 20 determines whether to generate a token. If it is determined not to generate a token, the method ends. If it is determined to generate a token, issuer 20 generates the token at step 214. Using the token, issuer 20 provides approval for a user of mobile device 12 to conduct mobile transactions up to a pre-determined value. In an embodiment, after generating the token, the method proceeds to FIG. 4 to implement security measures on the generated token before issuer 20 communicates the generated token to mobile device 12 associated with the user at step 216.

Modifications, additions, or omissions may be made to the method depicted in FIG. 2. For example, instead of the method ending when a token is not generated, the method may loop back to step 200 and begin again. In this example, there may be a period of time between the method restarting. The method may include more, fewer, or other steps. Additionally, steps may be performed in parallel or in any suitable order. Any suitable component of issuer 20 may perform one or more steps of the method.

Figure 3:
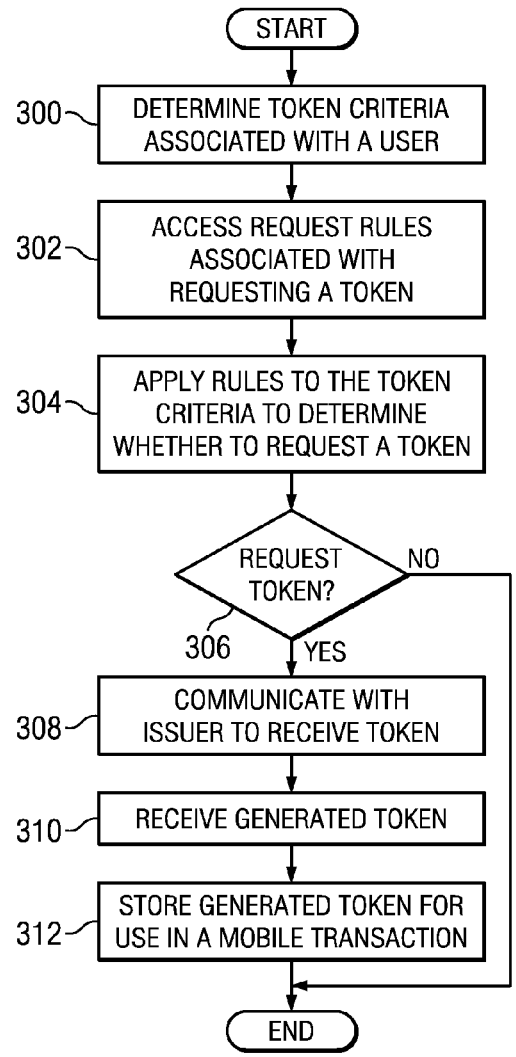
FIG. 3 illustrates an example method for receiving the authorized tokens at a mobile device to conduct mobile transactions.

FIG. 3 illustrates an example method for receiving the authorized tokens at mobile device 12 to conduct mobile transactions. At step 300, mobile device 12 determines token criteria associated with a user. Examples of the token criteria to determine include: a user's mobility, a user's bearing, a user's speed, a user's spending patterns, a user's current location, expiration of a previously issued token, and/or data regarding network performance of the mobile network. Mobile device 12 accesses request rules associated with requesting a token at step 302. In an embodiment, token application 14 includes rules regarding the timing of requesting a token. At step 304, the rules are applied to the token criteria to determine whether to request a token. For example, token application 14 may determine that a previously issued token has expired and mobile device 12 should request another token. As another example, token application 14 may determine that the user is in a particular location where the user typically conducts a mobile transaction. Accordingly, token application 14 may determine to request a token. As yet another example, token application 14 may determine that a user typically conducts a mobile transaction during a certain time of the day. Based on this information, token application 14 may determine to request a token before that particular time of day.

At step 306, token application 14 determines whether to request a token. If it is determined not to request a token, the method ends. If it is determined to request a token, mobile device 12 communicates a token request to issuer 20 at step 308. Mobile device 12 receives the generated token from issuer 20 at step 310. At step 312, mobile device 12 stores the generated token for use in a mobile transaction.

Modifications, additions, or omissions may be made to the method depicted in FIG. 3. The method may include more, fewer, or other steps. Additionally, steps may be performed in parallel or in any suitable order. Any suitable component of mobile device 12 may perform one or more steps of the method.

Figure 4:
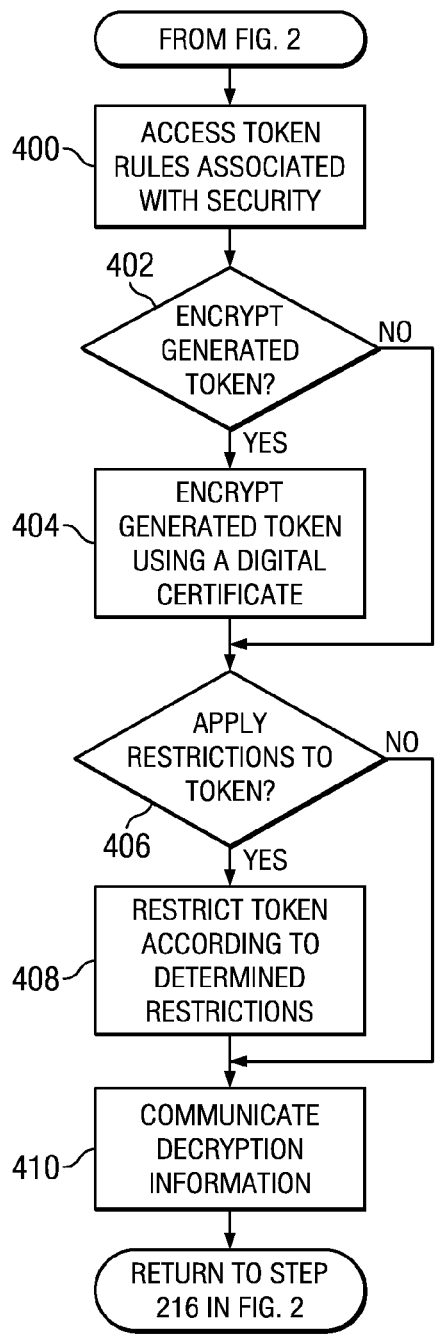
FIG. 4 illustrates an example method for implementing security measures for the authorized tokens used in the mobile transactions.

FIG. 4 illustrates an example method for implementing security measures for the authorized tokens used in the mobile transactions. Once issuer 20 generates a token, issuer 20 may determine to implement security measures to prevent unauthorized use of the token and to support secure transmission of the token. At step 400, issuer 20 access token rules associated with security. By accessing these rules, issuer 20 will determine what security measures to implement. At step 402, it is determined whether to encrypt the generated token. If issuer 20 determines to encrypt the token, the method proceeds to step 404 and the generated token is encrypted using a digital certificate. Otherwise, the method proceeds directly to step 406.

At step 406, issuer 20 determines whether to apply restrictions to the generated token. These restrictions may include amount restrictions, which limit the amount of the token, geographic restrictions, which limit the area in which the token may be used, or time restrictions, which limit the time period in which the token may be used. If issuer 20 determines to apply any restrictions, the token is restricted accordingly at step 408. Otherwise, the method proceeds directly to step 410. At step 410, issuer 20 communicates the decryption information to merchant terminal 40 and/or transaction module 50 to use when determining whether to authorize the token for the mobile transaction. The method may then return to step 216 in FIG. 2.

Modifications, additions, or omissions may be made to the method depicted in FIG. 4. The method may include more, fewer, or other steps. Additionally, steps may be performed in parallel or in any suitable order. Any suitable component of issuer 20 may perform one or more steps of the method.

Figure 5:
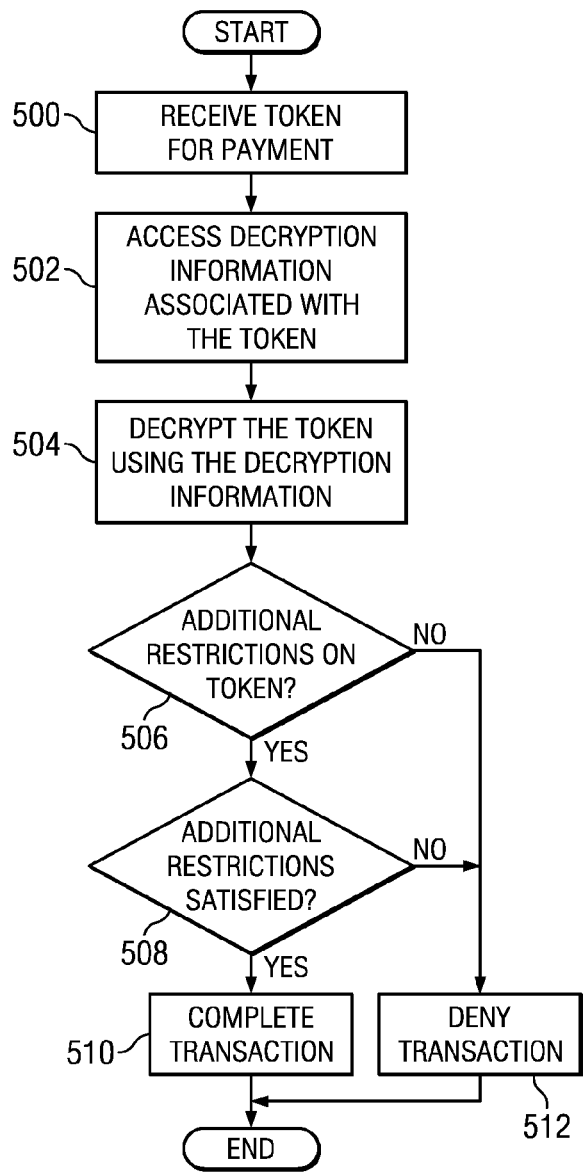
FIG. 5 illustrates an example method for conducting a mobile transaction using the implemented security measures.

FIG. 5 illustrates an example method for conducting a mobile transaction using the implemented security measures. At step 500, merchant terminal 40 receives a token for payment. At step 502, merchant terminal 40 accesses decryption information associated with the token. For example, merchant terminal 40 may access a digital certificate from decryption information 48 to decrypt the encrypted token. At step 504, the encrypted token is decrypted using the decryption information. Merchant terminal 40 determines at step 506 whether the token has any additional restrictions. The restrictions may be included within decryption information 48. If there are not any additional restrictions on the token, the method proceeds to step 512 to complete the transaction. If the token has additional restrictions, merchant terminal 40 determines whether the additional restrictions are satisfied at step 508. If the restrictions are satisfied, merchant terminal 40 proceeds with completing the transaction at step 510. Completing the transaction may include communicating the token information to transaction module 50 for reconciliation. Otherwise, merchant terminal 40 denies the transaction at step 510.

Modifications, additions, or omissions may be made to the method depicted in FIG. 5. The method may include more, fewer, or other steps. Additionally, steps may be performed in parallel or in any suitable order. Any suitable component of merchant terminal 40 may perform one or more steps of the method.

Figure 6:
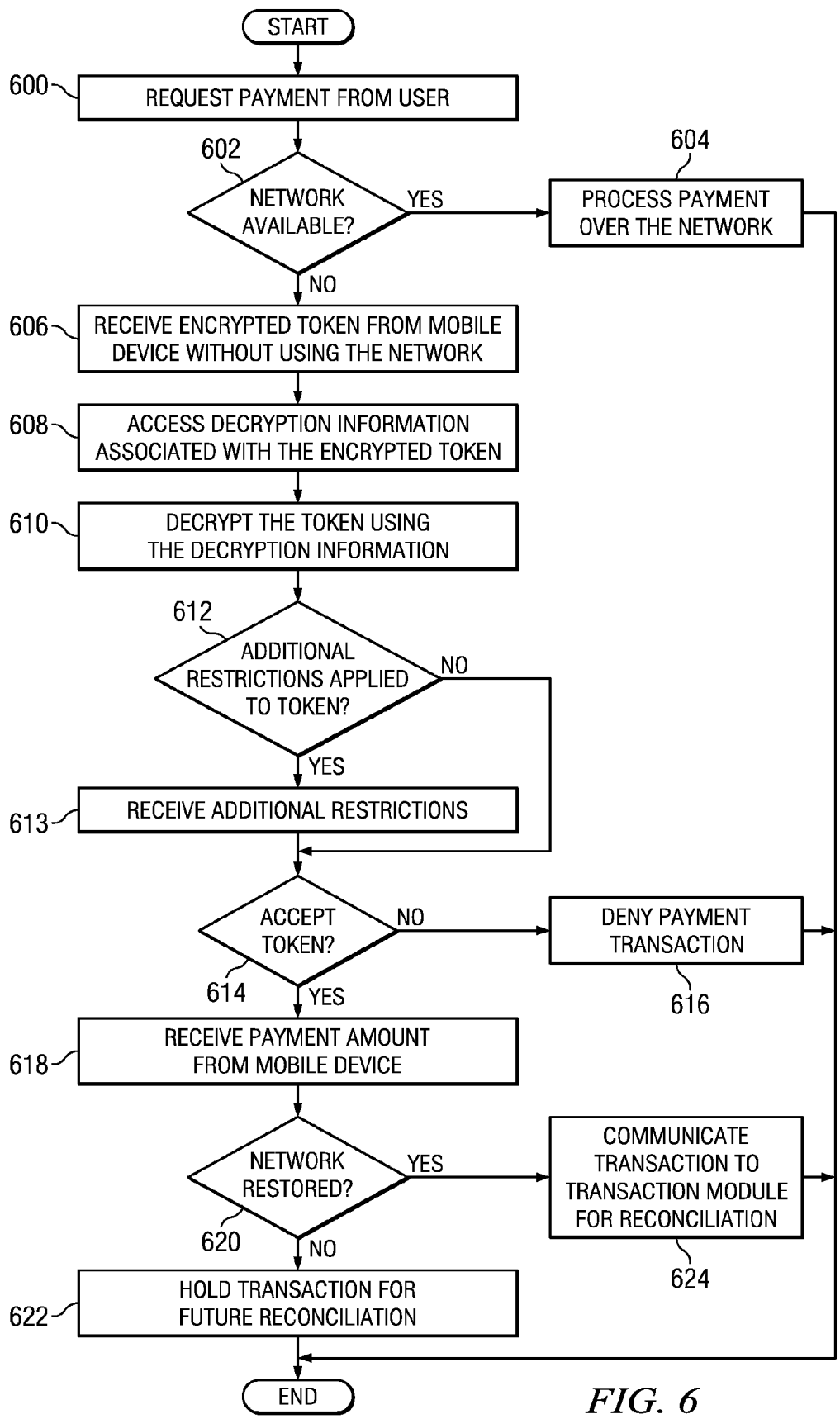
FIG. 6 illustrates an example method for processing a mobile transaction using an authorized token.

FIG. 6 illustrates an example method for processing a mobile transaction using an authorized token. At step 600, merchant terminal 40 requests payment from a user. At step 602, merchant terminal 40 determines whether network connectivity is available. For example, network 18 may not be available. As another example, mobile gateway 16 may not be available. If network 18 is available and mobile device 20 can communicate using mobile gateway 16, merchant terminal 40 may process the payment over the network at step 604. If either mobile gateway 16 and/or network 18 are not available, the method proceeds to step 606.

At step 606, merchant terminal 40 receives an encrypted token from mobile device 12 without using a network. For example, mobile device 12 may communicate the encrypted token using SMS, NFC, Bluetooth®, Wi-Fi, infrared techniques, a QR code, a bar code, or any other suitable communication technique. In certain embodiments, merchant terminal 40 may accommodate acceptance of the encrypted token using a plurality of communication techniques. If a plurality of communication techniques are available, merchant terminal 40 and/or mobile device 12 may determine which technique to use based on any suitable factor, such as the capability of mobile device 12, the technique that provides for the quickest transaction, the technique that has high reliability, or any other suitable factor. Upon receiving the encrypted token, merchant terminal 40 accesses decryption information associated with the encrypted token at step 608. Merchant terminal 40 decrypts the token using decryption information 48 at step 610 and determines whether additional restrictions applied to the token have been satisfied at step 612. If there are additional restrictions, merchant terminal 40 receives the additional restrictions at step 613.

At step 614, merchant terminal 40 determines whether to accept the token. Determining whether to accept the token may be based on whether the user satisfies the additional restrictions applied to the token. If the token is not accepted, merchant terminal 40 denies the payment at step 616. If the token is accepted at step 614, merchant terminal 40 receives the payment amount from mobile device 12. In an embodiment, the payment amount is deducted from the amount of the token.

At step 620, merchant terminal 40 determines whether network 18 has been restored. If the network is still unavailable, merchant terminal 40 holds the transactions for future reconciliation. If the network is available, merchant terminal 40 communicates the transaction to transaction module 50 for reconciliation. The method subsequently ends.

Modifications, additions, or omissions may be made to the method depicted in FIG. 6. The method may include more, fewer, or other steps. Additionally, steps may be performed in parallel or in any suitable order. Any suitable component of merchant terminal 40 may perform one or more steps of the method.

Figure 7:
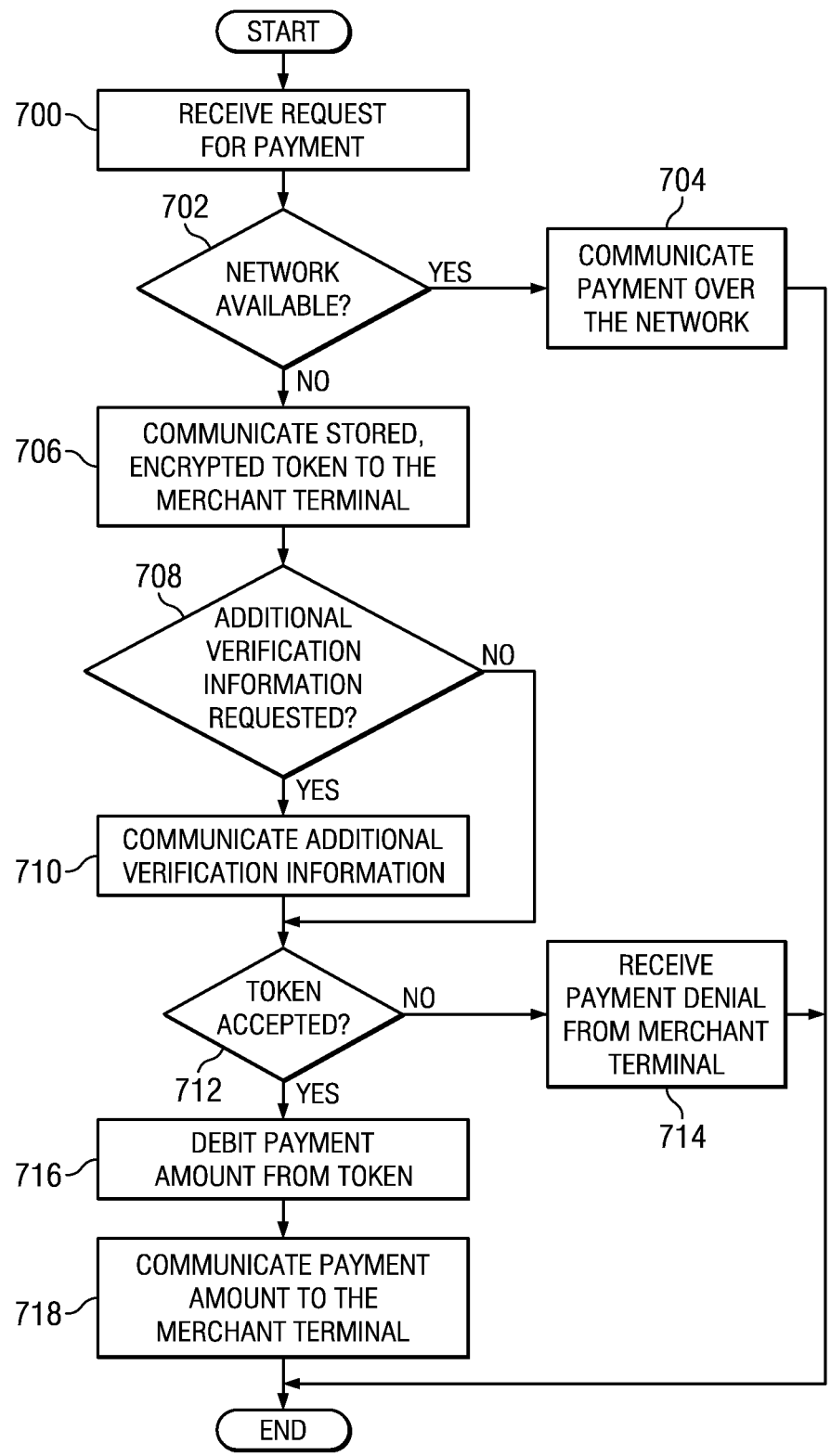
FIG. 7 illustrates an example method for conducting a mobile transaction using the authorized token.

FIG. 7 illustrates an example method for conducting a mobile transaction using the authorized token. At step 700, mobile device 12 receives a request for payment. At step 702, mobile device 12 determines whether network connectivity is available. For example, network 18 may not be available. As another example, mobile gateway 16 may not be available. If network 18 is available and mobile device 20 can communicate using mobile gateway 16, merchant terminal 40 may process the payment over the network at step 704. If either mobile gateway 16 and/or network 18 are not available, the method proceeds to step 706.

At step 706, mobile device 12 communicates a stored, encrypted token to merchant terminal 40 without using a network. For example, mobile device 12 may communicate the encrypted token using SMS, NFC, Bluetooth®, Wi-Fi, infrared techniques, a QR code, a bar code, or any other suitable communication technique. At step 708, mobile device 12 determines whether additional verification information is requested. If additional verification information is not requested, the method proceeds to step 712. If additional verification information is requested, mobile device 12 and/or the user of mobile device 12 communicates the additional verification information to merchant terminal 40. For example, the additional verification information may include biometric data, a personal identifier, a hardware identifier, or any other suitable data to authenticate mobile device 12, the token, and/or the user.

If the token is not accepted at step 712, mobile device 12 receives a payment denial from merchant terminal 40. If the token is accepted at step 712, mobile device 12 debits the payment amount from the stored token at step 716 and communicates the payment amount to merchant terminal 40 at step 718. In addition to decrementing the token on mobile device 12 by the payment amount, the number of uses may be decremented from the token. Upon completion of the transaction, the token may be deleted or retired or the token may immediately expire. The method subsequently ends.

Modifications, additions, or omissions may be made to the method depicted in FIG. 7. The method may include more, fewer, or other steps. Additionally, steps may be performed in parallel or in any suitable order. Any suitable component of mobile device 12 may perform one or more steps of the method.

Certain embodiments of the invention may provide one or more technical advantages. A technical advantage of one embodiment includes completing a mobile payment transaction using a mobile device without using a network and/or a mobile gateway. Therefore, a user is able to complete mobile transactions even though the network and/or mobile gateway are unavailable. Another technical advantage includes providing an authorized token to a mobile device for the mobile device to store and use to complete a mobile transaction at a future time. Therefore, the mobile device is able to complete mobile transactions using the stored, authorized token without having to communicate with an issuer to receive an authorized token or other real-time authorization at the time of the mobile transaction. Another technical advantage includes providing an authorized token to a mobile device for a mobile device to have access control. Yet another technical advantage includes providing security measures to the authorized token to minimize possible fraudulent use of the authorized token by someone other than the authorized user.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus, comprising:
   a memory operable to store token rules to generate a token for a user to complete a mobile transaction using a mobile device, performance data associated with a mobile gateway, and security rules associated with a generated token and the user;
   a processor communicatively coupled to the memory, the processor operable to:
      predict when the mobile gateway is available using the stored performance data;
      receive a request to generate the token;
      generate the token when:
         the prediction indicates that the mobile gateway is available;
         the user is in a location where the user has previously conducted the mobile transaction;
         the user has previously conducted the mobile transaction at that time of day; and
         mobile network connectivity data of the mobile device is below a predetermined threshold;
      access the security rules associated with the generated token;
      determine whether to encrypt the generated token by applying at least a first portion of the security rules to the generated token, the first portion of the security rules comprises rules to determine whether the user is in the location where the user has previously conducted the mobile transaction and to determine whether the user has previously conducted the mobile transaction at the time of day;
      encrypt the generated token; and
      apply at least a second portion of the security rules to the generated token to determine whether a personal identification of the user is required to use the token, the second portion of the security rules comprises rules to determine whether a previously issued token associated with the user has expired; and
   an interface communicatively coupled to the processor, the interface operable to communicate the encrypted token to the mobile device associated with the user, the encrypted token facilitating the mobile transaction when the mobile gateway is unavailable.

2. The apparatus of claim 1, wherein the processor is further operable to:
   determine whether to apply restrictions to the generated token; and
   restrict the generated token according to the determined restrictions.

3. The apparatus of claim 2, wherein the determined restrictions include at least one of the following:
   a time limit in which to use the generated token; and
   a geographic limit in which to use the generated token.

4. The apparatus of claim 1, wherein the processor is further operable to encrypt the generated token using at least one of the following:
   a digital certificate;
   a mobile device identifier;
   a user identifier; and
   biometric information associated with a user.

5. The apparatus of claim 1, wherein the processor is further operable to communicate decryption information to a merchant terminal.

6. The apparatus of claim 1, wherein the processor is further operable to communicate decryption information to a transaction module.

7. A method, comprising:
   storing, in a memory, token rules to generate a token for a user to complete a mobile transaction, performance data associated with a mobile gateway, and security rules associated with a generated token;
   predicting when the mobile gateway is available using the stored performance data;
   receiving a request to generate the token;
   generating the token when:
      the prediction indicates that the mobile gateway is available;
      the user is in a location where the user has previously conducted the mobile transaction;
      the user has previously conducted the mobile transaction at that time of day; and
      mobile network connectivity data of the mobile device is below a predetermined threshold;
   accessing the security rules associated with the generated token;
   determining, by a processor, whether to encrypt the generated token by applying at least a first portion of the security rules to the generated token, the first portion of the security rules comprises rules to determine whether the user is in the location where the user has previously conducted the mobile transaction and to determine whether the user has previously conducted the mobile transaction at the time of day;
   encrypting, by the processor, the generated token;
   applying, by the processor, at least a second portion of the security rules to the generated token to determine whether a personal identification of the user is required to use the token, the second portion of the security rules comprises rules to determine whether a previously issued token associated with the user has expired; and communicating the encrypted token to the mobile device associated with the user, the encrypted token facilitating the mobile transaction when the mobile gateway is unavailable.

8. The method of claim 7, further comprising:
determining whether to apply restrictions to the generated token; and
restricting the generated token according to the determined restrictions.

9. The method of claim 8, wherein the determined restrictions include at least one of the following:
a time limit in which to use the generated token; and
a geographic limit in which to use the generated token.

10. The method of claim 7, wherein encrypting the generated token comprises encrypting the generated token using at least one of the following:
a digital certificate;
a mobile device identifier;
a user identifier; and
biometric information associated with a user.

11. The method of claim 7, further comprising communicating decryption information to a merchant terminal.

12. The method of claim 7, further comprising communicating decryption information to a transaction module.

13. A non-transitory computer readable medium comprising logic, the logic, when executed by a processor, operable to:
store token rules to generate a token for a user to complete a mobile transaction, performance data associated with a mobile gateway, and security rules associated with a generated token;
predict when the mobile gateway is available using the stored performance data;
receive a request to generate the token;
generate the token when:
the prediction indicates that the mobile gateway is available;
the user is in a location where the user has previously conducted the mobile transaction;
the user has previously conducted the mobile transaction at that time of day; and
mobile network connectivity data of the mobile device is below a predetermined threshold;
access the security rules associated with the generated token;
determine whether to encrypt the generated token by applying at least a first portion of the security rules to the generated token, the first portion of the security rules comprises rules to determine whether the user is in the location where the user has previously conducted the mobile transaction and to determine whether the user has previously conducted the mobile transaction at the time of day;
encrypt the generated token;
apply at least a second portion of the security rules to the generated token to determine whether a personal identification of the user is required to use the token, the second portion of the security rules comprises rules to determine whether a previously issued token associated with the user has expired; and
communicate the encrypted token to the mobile device associated with the user, the encrypted token facilitating the mobile transaction when the mobile gateway is unavailable.

14. The non-transitory computer readable medium of claim 13, wherein the logic is further operable to:
determine whether to apply restrictions to the generated token; and
restrict the generated token according to the determined restrictions.

15. The non-transitory computer readable medium of claim 14, wherein the determined restrictions include at least one of the following:
a time limit in which to use the generated token; and
a geographic limit in which to use the generated token.

16. The non-transitory computer readable medium of claim 13, wherein the logic is further operable to encrypt the generated token using at least one of the following:
a digital certificate;
a mobile device identifier;
a user identifier; and
biometric information associated with a user.

17. The non-transitory computer readable medium of claim 13, wherein the logic is further operable to communicate decryption information to a merchant terminal.

18. The non-transitory computer readable medium of claim 13, wherein the logic is further operable to communicate decryption information to a transaction module.

* * * * *